(12) United States Patent
Hihn et al.

(10) Patent No.: US 6,723,169 B2
(45) Date of Patent: Apr. 20, 2004

(54) INSTALLATION FOR COATING OBJECTS WITH POWDER

(75) Inventors: Erwin Hihn, Walddorfhäslach (DE); Axel Halbmeyer, Böblingen (DE); Johannes Palesch, Weil im Schönbuch (DE)

(73) Assignee: Eisenmann Maschinenbau KG (DE)

( * ) Notice: Subject to any disclaimer, the term of this patent is extended or adjusted under 35 U.S.C. 154(b) by 0 days.

(21) Appl. No.: 10/379,369

(22) Filed: Mar. 4, 2003

(65) Prior Publication Data

US 2003/0217691 A1 Nov. 27, 2003

(30) Foreign Application Priority Data

Mar. 5, 2002 (DE) .......................... 102 09 499

(51) Int. Cl.⁷ .......................... B05C 15/00; B05B 15/12
(52) U.S. Cl. .......................... 118/309; 118/326; 454/50; 454/53; 55/DIG. 46
(58) Field of Search .......................... 118/308, 309, 118/326; 454/50, 53; 55/DIG. 46

(56) References Cited

U.S. PATENT DOCUMENTS

| | | | |
|---|---|---|---|
| 4,704,953 A | * | 11/1987 | Wilson .......................... 454/53 |
| 4,913,085 A | * | 4/1990 | Vohringer et al. .......... 118/312 |
| 5,246,578 A | * | 9/1993 | Spiegel et al. .............. 210/225 |
| 5,512,100 A | * | 4/1996 | Ingram et al. .............. 118/309 |

FOREIGN PATENT DOCUMENTS

| | | |
|---|---|---|
| DE | 32 14 290 C2 | 11/1984 |
| DE | 28 35 474 C2 | 3/1989 |
| DE | 196 48 354 A1 | 5/1998 |
| DE | 44 46 089 C2 | 5/2001 |
| EP | 1 086 750 A2 | 3/2001 |

\* cited by examiner

Primary Examiner—Richard Crispino
Assistant Examiner—Yewebdar Tadesse
(74) Attorney, Agent, or Firm—Factor & Lake

(57) ABSTRACT

An installation for coating objects with powder, in particular for powder painting, comprises a booth which is known per se and in which powder can be applied to the objects by an application device. Stray powder is entrained by an air stream directed through the interior of the booth from the top downwards. The mixture of air and powder is extracted via an extraction opening in the bottom of the booth and supplied to a movable filter unit which is situated beneath the extraction opening and in which the powder is separated from the air/powder mixture for reuse. A plurality of such movable filter units are movable while suspended from a supporting-rail system, it being possible for all of these filter units, which are each intended for separating off a particular type of powder in particular one powder paint color, to be selectively brought under the extraction opening of the booth. On changing the powder used in the booth, the filter unit intended for the particular powder can thus be brought to the required position in a simple manner without complex maintenance work, while the filter unit used until then can be parked in a parking position on the supporting-rail system until the specific type of powder is needed again.

9 Claims, 4 Drawing Sheets

INSTALLATION FOR COATING OBJECTS WITH POWDER

BACKGROUND OF THE INVENTION

The invention relates to an installation for coating objects with powder, in particular for powder painting, having a) a booth, in which powder can be applied to the objects by at least one application device;

b) an air supply device, with which air can be introduced into the booth, c) an extraction device, with which a mixture of air and excess powder can be extracted from the interior of the booth via at least one mixture outlet situated in the bottom; and d) a plurality of filter units, which can be selectively moved under the mixture outlet of the booth and which each have a filter separating the powder from the air.

In the coating of objects with powder, in particular in powder painting, it cannot be avoided that a considerable part of the powder leaving the application device does not adhere to the objects to be coated. It is known to recover this excess powder (frequently called "overspray") to a large extent by means of an air stream flowing through the booth from the top downwards. In the process, the air stream takes up the stray excess powder. A mixture of air and powder is extracted via a mixture outlet situated in the bottom and is led to a filter unit in which the powder is separated from the air/powder mixture in order to be passed on for reuse.

If a frequent change of the powder being used, for example a change of the colour of the painting powder, is required, it is not economical to clean the filter units each time. Rather, it is known in this case to provide a plurality of movable filter units which are each intended for a particular type of powder, thus for example one powder colour. In each case that filter unit is coupled to the mixture outlet of the booth which is intended for using that type of powder which is currently being employed in the booth. On changing the type of powder, only the filter unit active at the time needs to be replaced by another filter unit.

In known installations of the type mentioned at the outset, the filter units had wheels for rolling on the room floor. However, this was not without problems in terms of handling: on the one hand, the filter units exhibited a not inconsiderable rolling resistance, in particular on changing direction, on the other hand, with an uneven room floor, exchanging the filter units involved adjusting work. On changing the colour, not only did the filter unit have to be laboriously exchanged, but the entire booth and its outlet funnels also had to be cleaned.

The object of the present invention is therefore to design an installation of the type mentioned at the outset in such a way that exchanging the filter units on changing the type of powder is simplified.

This object is achieved according to the invention in that e) the filter units can be moved while suspended from a supporting-rail system.

SUMMARY OF THE INVENTION

Since, according to the invention, the filter units are suspended from the supporting-rail system, they do not need to follow the course of the floor any longer. This has two consequences: the height at which the filter units move is predetermined by the supporting-rail system. Readjustment on connecting a new filter unit is thus no longer necessary. The evenness of the rolling surfaces predetermined by the supporting-rail system means that only small forces are required on moving the filter units.

It is expedient for the supporting-rail system to have a plurality of parking positions at each of which a filter unit can be kept in readiness. The basic construction of such a supporting-rail system can thus resemble a "marshalling yard". It can optionally be designed such that any filter unit can reach any parking position. Alternatively, however, it is also possible to design the supporting-rail system so that each filter unit is assigned a specific parking position. The parking positions can differ from the other regions of the supporting-rail system in that they have devices for stopping the filter units and/or for detecting the presence of the filter unit.

In their "active" working position beneath the mixture outlet of the booth, the filter units must of course be open at the top. However, during the times when they are placed in readiness in a parking position, each filter unit should be closable by a cover in order to avoid fouling.

For this purpose, there may be provided, at each parking position for example, a cover which can be placed against the inlet of the filter unit situated in the corresponding parking position. This cover is therefore assigned permanently to a particular parking position and not to a particular filter unit.

It is of course also possible for each filter unit to be provided with a removable cover, in which case the cover moves along with the filter unit. By way of example, the cover can be pivotably attached to the filter unit.

Particular preference is given to that embodiment of the invention in which the inlet of each filter unit is formed by a bellows which is expandable in the vertical direction and carries a seal. The filter unit which is "active" at the time is therefore connected to the mixture outlet of the booth by extending the bellows upwards and placing the seal against the mixture outlet of the booth.

In this case, there can be attached to the upper border of the bellows a sealing frame, on which the seal is fastened and which is movable in the vertical direction by means of a drive device. A piston/cylinder unit in particular is suitable as the drive device.

Finally, it is expedient for there to be provided on the rail system at least one cleaning position, at which devices serving to clean the filter units are arranged. Extraction and blow-out fans in particular, optionally also appliances operating with liquid cleaning agents, are suitable as such devices. If a particular type of powder is no longer required in the installation for some time and it is therefore no longer necessary to reserve a particular filter unit for this type of powder, the filter unit in question can be brought into the cleaning position on the rail system, where it can be cleaned thoroughly to remove the old type of powder and in this way prepared for use with another type of powder.

BRIEF DESCRIPTION OF THE DRAWINGS

An exemplary embodiment of the invention is explained in more detail below with reference to the drawing, in which.

DETAILED DESCRIPTION OF THE DRAWINGS

Figure 1:
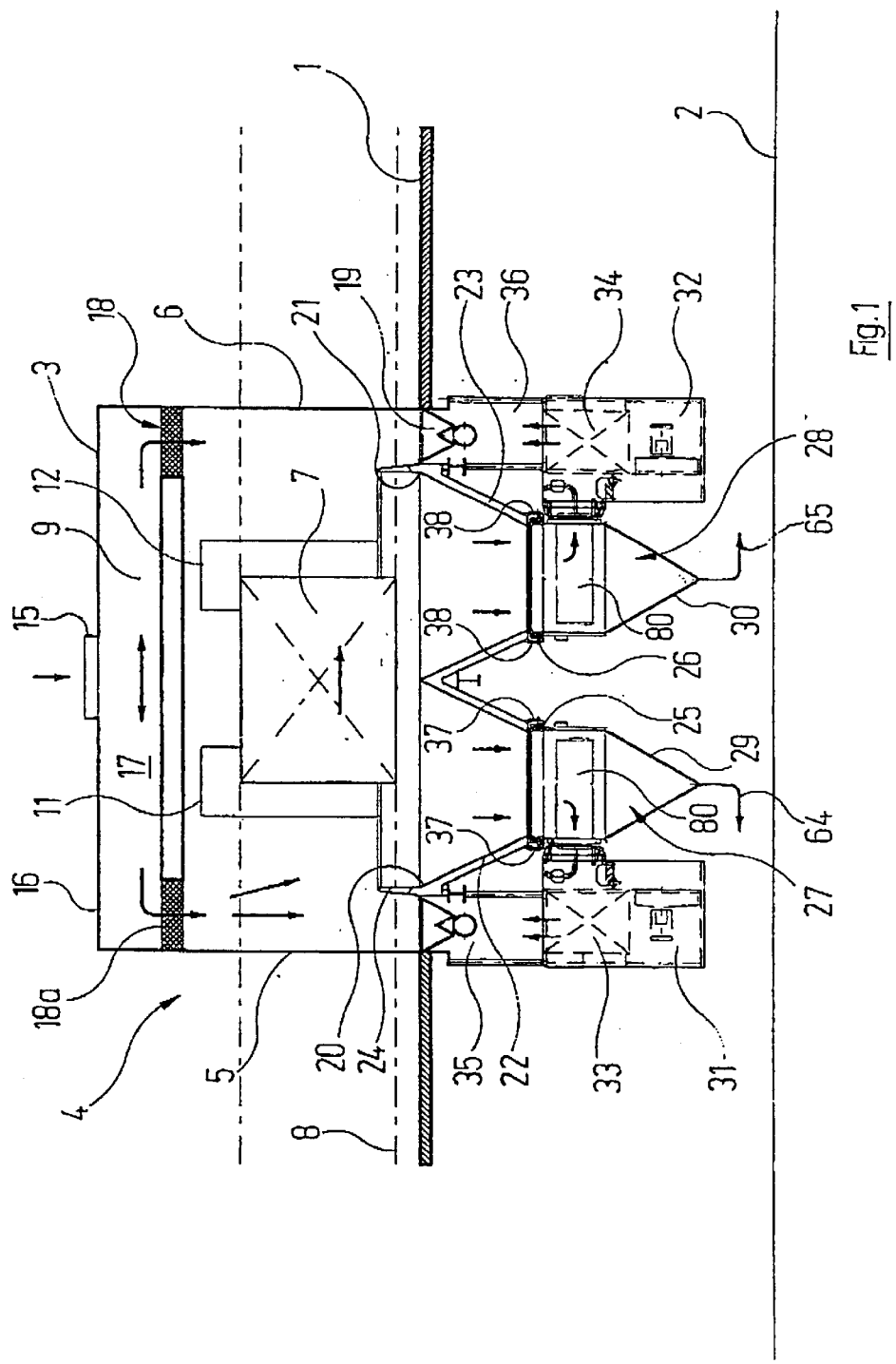
FIG. 1 shows a section through a powder painting installation parallel to the direction of movement of the objects to be painted.
Figure 2:
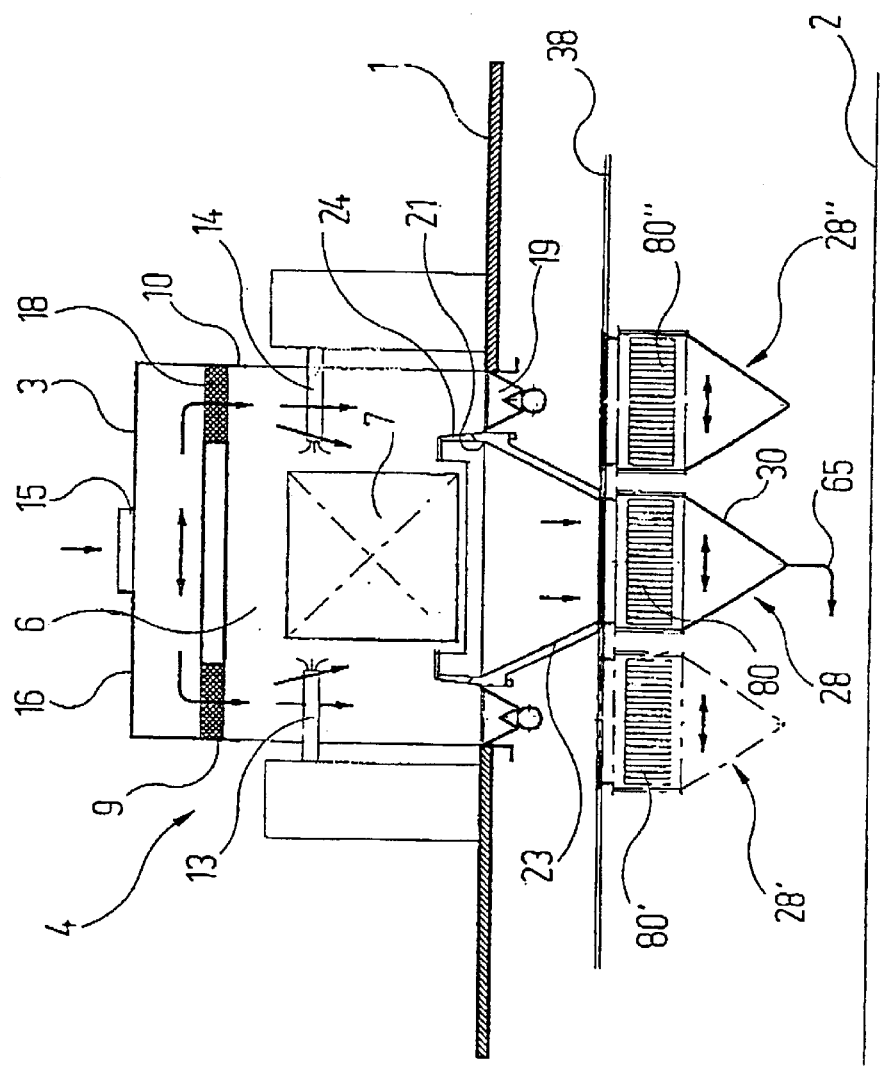
FIG. 2 shows a section through the powder painting installation of FIG. 1 perpendicular to the direction of movement of the objects to be painted.

As is largely customary in powder painting installations, the one illustrated also comprises a walk-on platform 1, which, for example supported by a steel structure (not depicted), runs at a distance above the room floor 2. The substantially cuboid-shaped housing 3 of a powder painting booth 4 is mounted on the walk-on platform 1. Through closable doors at opposite end faces 5 and 6 of the housing 3 of the powder painting booth 4, the objects 7 to be painted are brought into the interior of the powder painting booth 4 and removed from it again in a particular work cycle with the aid of a schematically illustrated conveying system 8. Situated in the lateral walls 9, 10 of the powder painting booth 4 which extend parallel to the direction of movement of the objects 7 are openings 11, 12 (cf. FIG. 1), through which extend the application devices 13, 14, with the aid of which painting powder is applied to the objects 7 in the known manner.

Supply air is introduced through an inlet connection 15 in the upper side 16 of the powder painting booth 4 into an air plenum 17 which is bounded downwardly by a suspended filter ceiling 18. The air flowing through the filter ceiling 18 flows downwards substantially in the border regions 18a of the housing 3 of the powder painting booth 4, takes up stray powder particles in the process and flows therein, in part, to an extraction channel 19 running annularly along the entire border of the bottom of the housing 3 in the interior of the powder painting booth 4 and connected to an extraction fan (not illustrated). The powder entrained with this flow is discarded.

A further part of the mixture of air and powder particles flows to two relative large extraction openings 20, 21 which are arranged one behind the other in the direction of movement of the objects 7, are rectangular in plan view and are formed by the upper inlet openings of two extraction funnels 22, 23. The quantitative proportions in which the air/powder mixture flows into the extraction channel 19 on the one hand and into the extraction opening 20, 21 on the other hand can be influenced by the width of the extraction channel 19 and by the geometry of an apron 24 which is placed on the bottom of the powder painting booth 4 so as to surround the two openings 20 and 21 and reaches upwards to such an extent that it surrounds the lower region of the objects 7. Through the lateral distance separating the apron 24 from the workpiece 7, it is additionally possible to influence the velocity at which the air/powder mixture flows past the objects 7 to the extraction openings 20, 21.

Connected leaktightly to the lower smaller cross-section outlet openings 25, 26 of the two extraction funnels 22, 23 is in each case one movable filter unit 27, 28. The latter have a respective housing 29 and 30 which is cuboid-shaped in its upper section and funnel-shaped in its lower section. Arranged in the upper part of the housings 29, 30 of the filter units 27, 28 is in each case one filter 80 which has a plurality of filter elements and through which air can flow. The air flows out, as indicated by the arrows in FIG. 1, through a lateral window in the cuboid-shaped upper section of the housings 29, 30 and into a box 31, 32 containing assemblies, in which there is situated in each case one fan 33, 34. The air is conveyed by the fan 33, 34 into air ducts 35, 36 which lead either to an air preparation unit in the case of recirculation of the air or to the outside atmosphere.

The filters 80 are each installed in a frame in such a way that the individual filter elements can be removed from this frame, as required, via a lateral window in the corresponding housing 29, 30.

Figure 3:
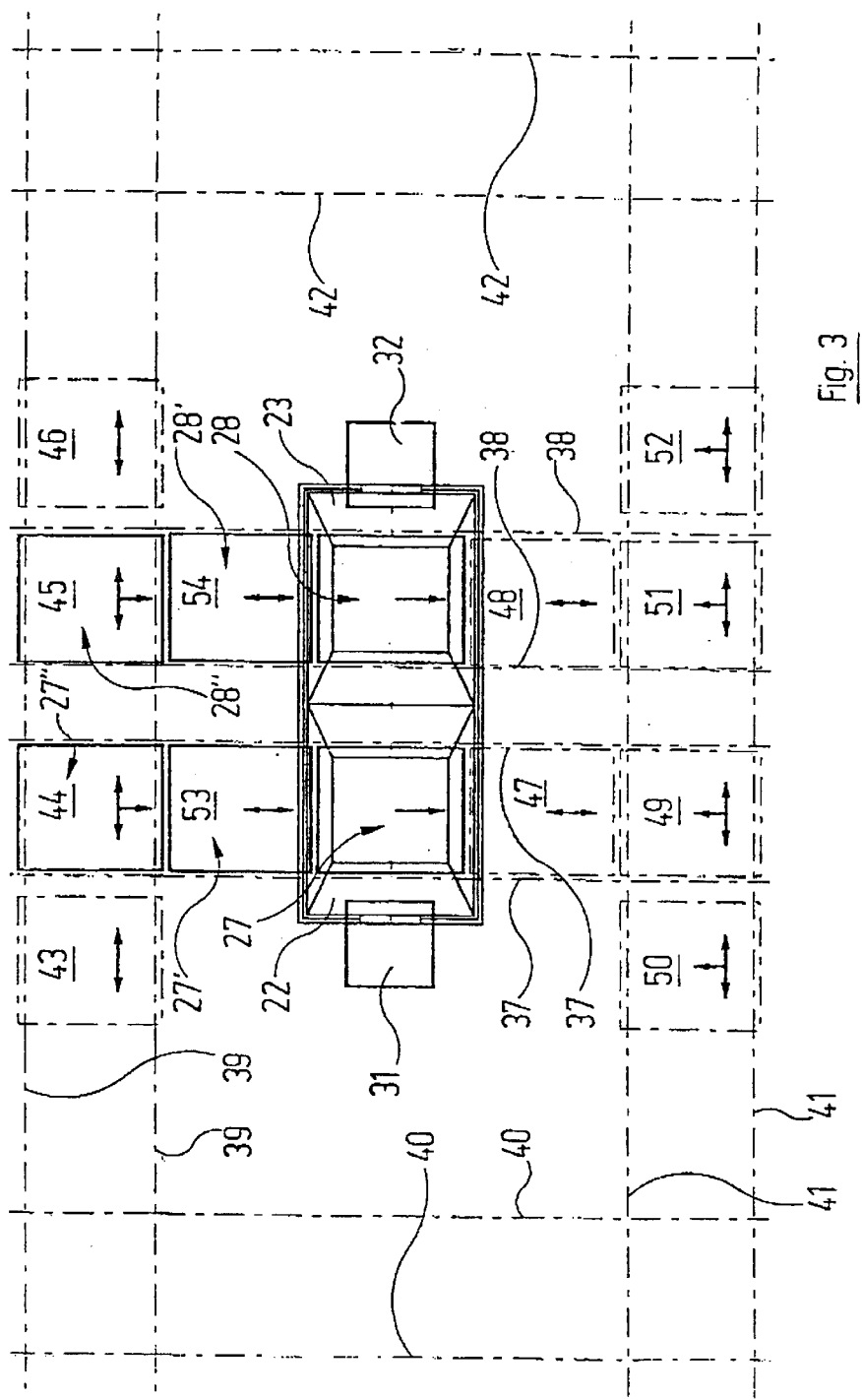
FIG. 3 shows a plan view of the rail system on which the filter units of the painting installation of FIGS. 1 and 2 are movable.

The movable filter units 27, 28 are each suspended from rails 37, 38 extending transversely to the direction of movement of the objects 7 (cf. in particular FIG. 3). The rails 37, 38 are part of a more complex rail system which, in the exemplary embodiment illustrated, additionally has rails 39, 40, 41, 42 running along the sides of a large rectangle surrounding the powder painting booth 4. At the points where rectilinear rail sections 37 to 42 meet one another, there are provided suitable transfer devices (not illustrated in the drawing), for example turntables, so that the filter units 27, 28 can travel across the entire rail system.

On the rail system 37 to 42 there are a multiplicity of parking positions, at each of which a movable filter unit 27', 27", 28', 28" can be kept in readiness, the said filter unit corresponding completely in its design to the filter units 27 and 28, but being intended for use with a different-coloured painting powder. On one side of the extraction funnels 22, 23, or above them in FIG. 3, there are provided two positions 53, 54 at which the movable filter units can be cleaned with the aid of devices (not illustrated) to prepare them for a new colour.

Figure 4:
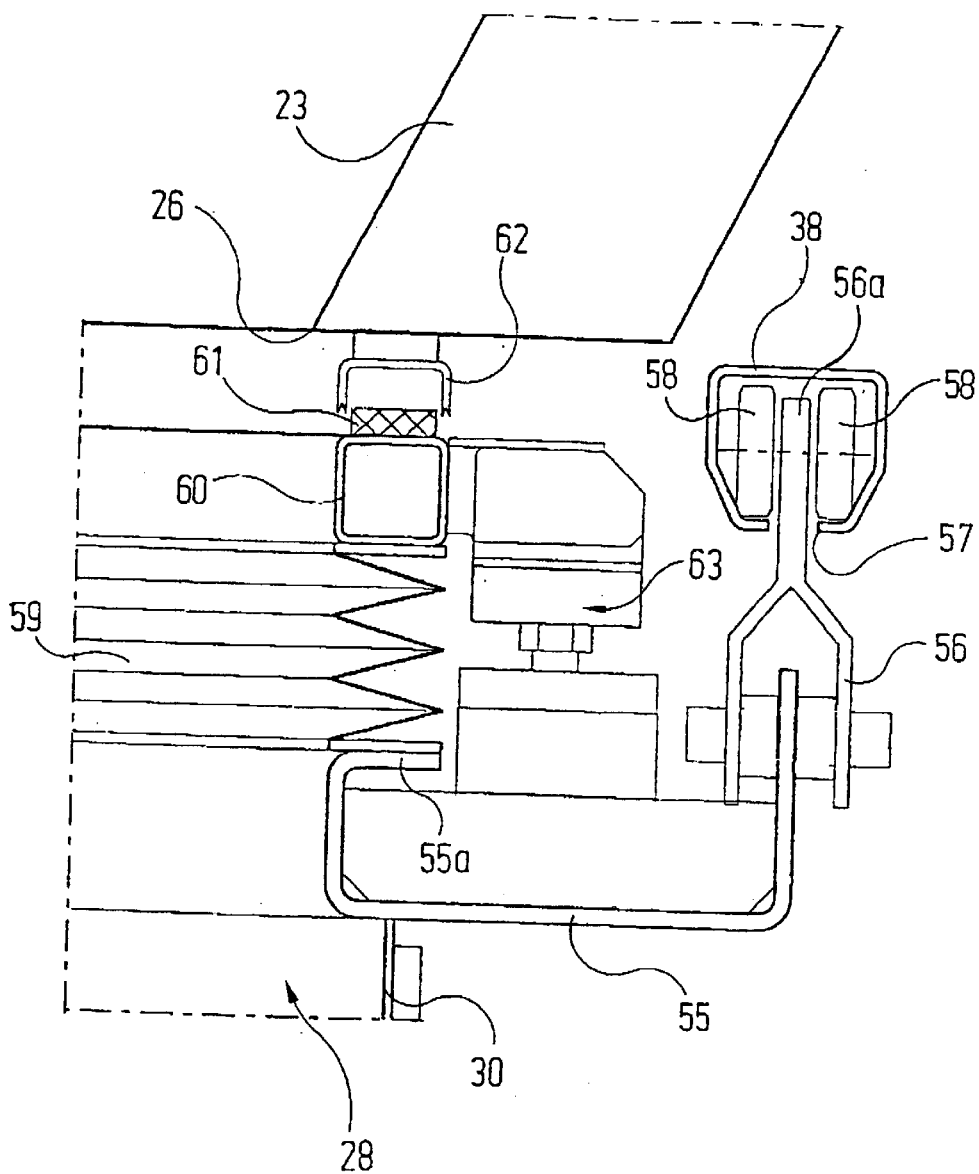
FIG. 4 shows a detail enlargement from FIG. 1.

FIG. 4 illustrates how one (28) of the filter units 27, 28 is suspended at its upper border from the rail 38, which is a hollow section. Fastened to a sectional frame 55 surrounding the upper border of the housing 30, at the leg running parallel to the rails 38, are a plurality of roller holders 56 which are inserted by a narrow, upper section 56a through a slot 57 into the interior of the rail 38. Pairs of rollers 58 in each case are mounted therein on the section 56a of the roller holders 56 and roll on the lower inner surfaces of the rail 38.

A sealing bellows 59 carrying a sealing frame 60 at its upper side is mounted on a horizontal leg 55a of the sectional frame 55. A peripheral flat seal 61 is arranged on the sealing) frame 60 for its part. Mounted on the lower side of the extraction funnel 23 is a downwardly open U-section 62 into which the flat seal 61 can plunge. The sealing frame 60 is, lastly, connected to a piston-cylinder unit 63 which is likewise supported on the sectional frame 55, such that the vertical position of the sealing frame 60 and hence the expansion of the bellows 59 can be altered by actuating the piston-cylinder unit 63.

The way in which the above-described powder painting installation works is as follows:

The normal operation of the installation is essentially the same as the conventional installation: the objects 7 to be painted are brought into the powder painting booth 4 with the aid of the conveying system 8. The objects 7 are coated with painting powder by the application devices 13, 14 in a continuous or intermittent pass. Excess painting powder which has not been deposited on the objects 7 mixes with the air introduced into the interior of the powder painting booth via the filter ceiling 18. The air/powder mixture flows in the region close to the walls into the extraction channel 19 and from there is disposed of.

The other part of the air/powder mixture passes, as already mentioned above, into the extraction funnels 22, 23 and from there into the movable filters 27, 28. In this process, the latter are leaktightly connected to the lower outlet openings 25, 26 of the extraction funnels 22, 23 by moving the sealing frames 60 of the corresponding bellows 59 upwards with the aid of the respective piston-cylinder unit 63 until the flat seals 61 lie against the bottom of the U-sections 62 of the extraction funnels 22, 23. The air then flows through the filter provided in the upper, cuboid-shaped sections of the housings 29, 30 of the filter units 27, 28, through the corresponding lateral window of the filter units 27, 28 into the boxes 31, 32 containing assemblies and from there is passed on, with the aid of the fans 33, 34 via the air ducts 35, 36, for reprocessing or to the outside atmosphere.

In contrast, the powder entrained by the air/powder mixture is collected in the lower, funnel-shaped sections of the housings 29, 30 of the filter units 27, 28, drawn off at the lower ends thereof and passed on, via lines 64, 65, for reuse.

If a change of the colour of the painting powder applied in the powder painting booth 4 is to be carried out, the filter units 27, 28 are detached from the lower outlet openings 25, 26 of the extraction funnels 22, 23. For this purpose, the sealing frames 60 are moved downwards with the aid of the piston-cylinder units 63, thereby compressing the bellows 59. The filter units 27, 28 can now be moved away, either manually or by motor drive, on the rail system from the position beneath the outlet openings 25, 26 of the extraction funnels 22, 23 and into any desired parking position 43 to 52, where they are kept in readiness until the time when the same colour is to be used again.

At each of these parking positions, the openings of the sealing frames 60 of the filter units 27, 28 can be closed by a cover. These covers can be provided either stationarily at the respective parking positions 43 to 52; in this case, the flat seals 61 at the upper end of the bellows 59 can be pressed against the covers with the aid of the piston-cylinder units 63 in the same way as described above for the connection of the bellows 59 to the extraction funnels 22, 23. Alternatively, however, each filter unit 27, 28 can also be provided with a pivoting cover which is pivoted to the side when the corresponding filter unit 27, 28 is situated in the position beneath an extraction funnel 22, 23.

Once the positions beneath the extraction funnels 22, 23 have become free, another filter unit, which until then has been parked at one of the parking positions 43 to 52, and which is intended for use with the new colour to be used, can be moved beneath the extraction funnels 22, 23 and leak-tightly connected thereto by raising the sealing frames 60.

The painting within the powder painting booth 4 can now be started with the new colour powder.

If a particular colour is no longer required for some time and it is therefore not necessary to keep one of the filter units, reserved for this colour, in permanent readiness, the corresponding filter unit can be cleaned in the positions 53, 54 of the rail system, so that it can now be used for another colour of the painting powder.

What is claimed is:

1. Installation for coating objects with powder, in particular for powder painting, having
    a) a booth, in which powder can be applied to the objects by at least one application device;
    b) an air supply device, with which air can be introduced into the booth;
    c) an extraction device, with which a mixture of air and excess powder can be extracted from the interior of the booth via at least one mixture outlet situated in the bottom; and
    d) a plurality of filter units, which can be selectively moved under the mixture outlet of the booth and which each have a filter separating the powder from the air, characterised in that:
    e) the filter units can be moved while suspended from a supporting-rail system.

2. Installation according to claim 1, characterised in that the supporting-rail system has a plurality of parking positions, at each of which a filter unit can be placed in readiness.

3. Installation according to claim 2, characterised in that each filter unit can be closed at each parking position by a cover.

4. Installation according to claim 3, characterised in that there is provided at each parking position a cover which can be placed against an inlet of the filter unit situated in the corresponding parking position.

5. Installation according to claim 3, characterised in that each filter unit is provided with a removable cover.

6. Installation according to claim 5, characterised in that the cover is pivotably attached to the filter unit.

7. Installation according to claim 1, characterised in that the inlet of each filter unit is formed by a bellows which is expandable in the vertical direction and carries a seal.

8. Installation according to claim 7, characterised in that there is attached to an upper border of the bellows a sealing frame, on which the seal is fastened and which is movable in the vertical direction by means of a drive device.

9. Installation according to claim 1, characterised in that there is provided on the supporting-rail system at least one cleaning position, at which devices serving to clean the filter units are arranged.

* * * * *